United States Patent
Bechtel et al.

(10) Patent No.: US 12,233,760 B2
(45) Date of Patent: Feb. 25, 2025

(54) VEHICLE SYSTEMS INCLUDING STOWABLE AND DEPLOYABLE VEHICLE MOTION CONTROLLER

(71) Applicant: FCA US LLC, Auburn Hills, MI (US)

(72) Inventors: Travis D Bechtel, Goodrich, MI (US); Brandon Brady, Lapeer, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/391,746

(22) Filed: Dec. 21, 2023

(65) Prior Publication Data

US 2024/0217576 A1    Jul. 4, 2024

Related U.S. Application Data

(60) Provisional application No. 63/478,374, filed on Jan. 4, 2023.

(51) Int. Cl.
| | |
|---|---|
| *B60K 26/02* | (2006.01) |
| *B60N 2/015* | (2006.01) |
| *B60N 2/30* | (2006.01) |
| *B60N 2/56* | (2006.01) |
| *B60N 2/64* | (2006.01) |
| *B60N 2/68* | (2006.01) |
| *B60N 2/75* | (2018.01) |
| *B60N 2/90* | (2018.01) |
| *B60N 3/10* | (2006.01) |
| *B60R 7/04* | (2006.01) |
| *B60R 21/203* | (2006.01) |

(Continued)

(52) U.S. Cl.
CPC .............. *B60N 2/30* (2013.01); *B60K 26/02* (2013.01); *B60N 2/015* (2013.01); *B60N 2/56* (2013.01); *B60N 2/64* (2013.01); *B60N 2/68* (2013.01); *B60N 2/773* (2018.02); *B60N 2/90* (2018.02); *B60N 3/102* (2013.01); *B60R 7/04* (2013.01); *B60R 7/043* (2013.01); *B60R 21/203* (2013.01); *B62D 1/046* (2013.01); *B62D 1/183* (2013.01); *B62D 25/087* (2013.01); *B62D 25/20* (2013.01); *B60K 2026/028* (2013.01); *B60R 2011/008* (2013.01)

(58) Field of Classification Search
CPC . G05G 9/02; G05G 9/047; B62D 1/04; B62D 1/183; B62D 1/12; Y10T 74/20256; Y10T 74/20396; Y10T 74/20864; Y10T 74/20834; B60K 2026/028
See application file for complete search history.

(56) References Cited

U.S. PATENT DOCUMENTS

| | | | |
|---|---|---|---|
| 9,550,514 B2 * | 1/2017 | Schulz | .................. B60R 21/264 |
| 2017/0073000 A1 * | 3/2017 | Numazaki | ................ B62D 1/04 |

(Continued)

*Primary Examiner* — James A English
(74) *Attorney, Agent, or Firm* — Jeremy J. Klobucar

(57) ABSTRACT

In at least some implementations, a motion control system for a vehicle includes a steering shaft having an axis of rotation and a motion control input coupled to the steering shaft for rotation with the steering shaft about the axis of rotation. The motion control input is pivotable about a pivot axis that is at a non-zero angle to the axis of rotation, and wherein pivoted movement of the motion control input about the pivot axis in a first direction causes a forward motion of the vehicle, and pivoted movement of the motion control input about the pivot axis in a second direction that is opposite to the first direction reduces a speed of forward motion of the vehicle.

15 Claims, 3 Drawing Sheets

(51) Int. Cl.
B62D 1/04 (2006.01)
B62D 1/183 (2006.01)
B62D 25/08 (2006.01)
B62D 25/20 (2006.01)
B60R 11/00 (2006.01)

(56) References Cited

U.S. PATENT DOCUMENTS

| | | | |
|---|---|---|---|
| 2020/0130723 A1* | 4/2020 | Cao | B62D 1/183 |
| 2021/0221356 A1* | 7/2021 | Sato | B62D 1/12 |
| 2021/0316777 A1* | 10/2021 | Kwon | B62D 1/181 |
| 2023/0322296 A1* | 10/2023 | Kim | B62D 1/181 |

* cited by examiner

VEHICLE SYSTEMS INCLUDING STOWABLE AND DEPLOYABLE VEHICLE MOTION CONTROLLER

REFERENCE TO RELATED APPLICATIONS

This application claims the benefit of U.S. Provisional Application Ser. No. 63/478,374 filed on Jan. 4, 2023, the entire contents of which is incorporated herein by reference in its entirety.

FIELD

The present application relates generally to passenger vehicles and, more particularly, to a stowable vehicle motion controller.

BACKGROUND

Vehicles include steering inputs, such as steering wheels, that are located within a forward area of a passenger compartment in a fixed manner and which take up considerable space within the passenger compartment.

SUMMARY

In accordance with one example aspect of the invention, a vehicle is provided. In an example implementation, the vehicle includes a stowable steering yoke with tiltable yoke handles for acceleration/braking.

In at least some implementations, a motion control system for a vehicle includes a steering shaft having an axis of rotation and a motion control input coupled to the steering shaft for rotation with the steering shaft about the axis of rotation. The motion control input is pivotable about a pivot axis that is at a non-zero angle to the axis of rotation, and wherein pivoted movement of the motion control input about the pivot axis in a first direction causes a forward motion of the vehicle, and pivoted movement of the motion control input about the pivot axis in a second direction that is opposite to the first direction reduces a speed of forward motion of the vehicle.

In at least some implementations, at least part of the steering shaft, or a sliding connector coupled to the steering shaft, is slidable in the direction of the rotational axis. In at least some implementations, a cross-bar is coupled to the steering shaft and the motion control input is connected to the cross bar, and the cross-bar is coupled to the steering shaft for co-rotation of the cross-bar with the steering shaft. In at least some implementations, the cross-bar is slidably coupled to the steering shaft to change the axial location of the cross-bar relative to the steering shaft, with respect to the axis of rotation. In at least some implementations, the motion control input is pivotably connected to the cross-bar for movement in the first direction and the second direction.

In at least some implementations, a steering column has a housing in which at least part of the steering shaft is received. In at least some implementations the motion control input extends outwardly relative to opposite sides of the housing. In at least some implementations, the motion control input includes two yoke handles that are slidably coupled to the steering shaft for movement relative to the housing in the direction of the rotational axis.

In at least some implementations, a vehicle includes an instrument panel having a compartment, a steering shaft having an axis of rotation and being at least partially received in the compartment, and at least part of the steering shaft is slidable relative to the instrument panel in the direction of the rotational axis, and a motion control input coupled to the steering shaft for rotation with the steering shaft about the axis of rotation. The motion control input is pivotable about a pivot axis that is at a non-zero angle to the axis of rotation. Pivoted movement of the motion control input about the pivot axis in a first direction causes a forward motion of the vehicle, and pivoted movement of the motion control input about the pivot axis in a second direction that is opposite to the first direction reduces a speed of forward motion of the vehicle. The steering shaft and the motion control input have a stowed position in which the motion control input is received at least partially in the compartment and a deployed position in which the motion control input is outboard of the compartment.

In at least some implementations, a steering column is provided that has a housing in which at least part of the steering shaft is received, and wherein part of the housing extends outwardly from the compartment in the deployed position. In at least some implementations, an air bag is carried by the housing, and an air bag cover is carried by the housing, wherein the air bag cover is received over an outer end of the housing and the compartment includes an open end facing into an interior of the vehicle and the air bag is adjacent to the open end and is oriented out of the compartment so that the air bag may deploy within an interior of the vehicle in the stowed position. In at least some implementations, in the deployed position, the outer end is received in the interior of the vehicle and is spaced from the instrument panel.

In at least some implementations, in the stowed position, at least a majority of the motion control input is received within the compartment.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
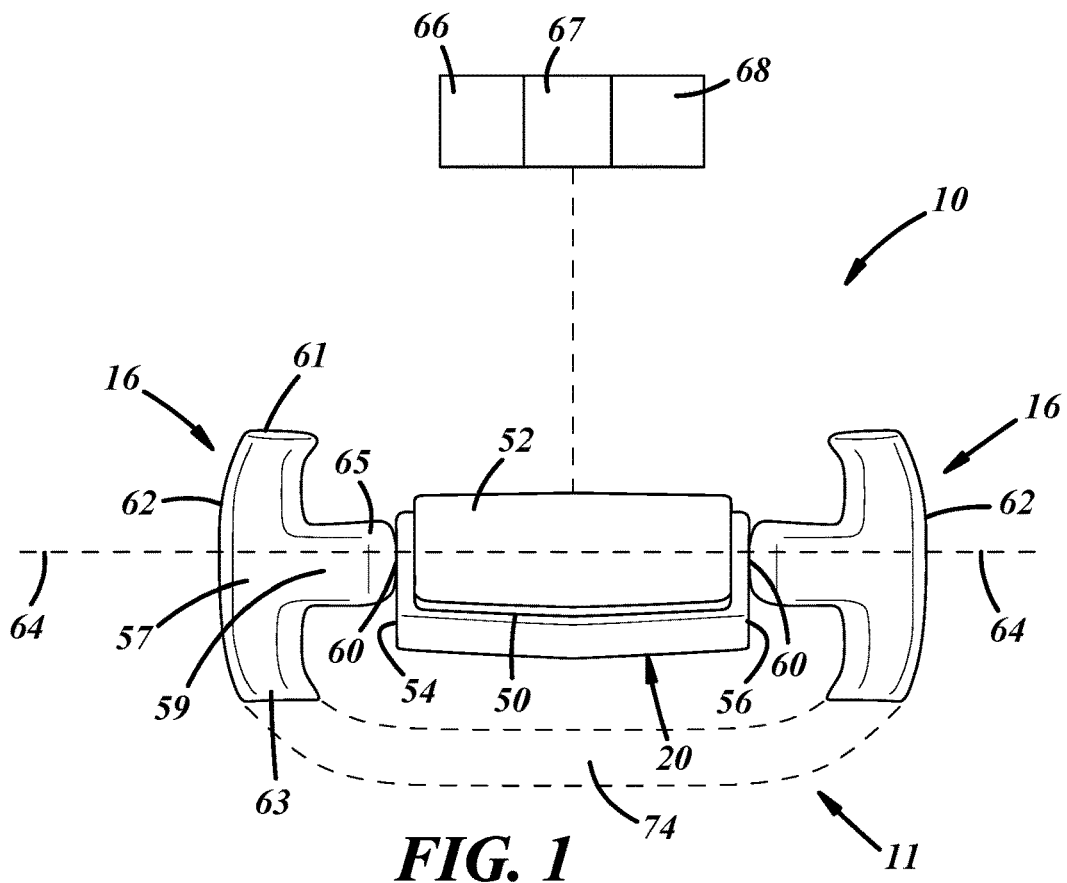
FIG. 1 illustrates an example stowable motion control system for a vehicle in a deployed state.

With initial reference to FIG. 1, an example stowable steering system 10, called hereafter a motion control system 10, for a vehicle is illustrated. Conventional steering assemblies are configured to change the driving direction of a vehicle when a driver rotates the steering wheel in a particular direction. For example, rotation of the steering wheel typically rotates a steering column shaft, which transmits the rotary force through a universal joint to a rack and pinion gear. The rotational motion of the steering column is then converted into rectilinear motion and transmitted through a rack bar, tie rod, and tire knuckle to change the angle of steerable wheels of the vehicle and thus, the driving direction of the vehicle. With the advent of driverless or autonomous vehicles, steering wheels may needlessly occupy cabin space when a driver is not controlling the vehicle, and steering wheels may hinder the ingress or egress of a driver when the vehicle is off. Further, structures needed to mount the steering wheel in a vehicle take up space and increase the weight of a vehicle. Still further, steering wheels manage only the driving or steering angle and acceleration and braking of the vehicle are accomplished with foot actuated pedals that likewise are arranged in and take up cabin space. To control the movement and steering of a vehicle with the steering wheel and pedal inputs, at least one hand and leg/foot are needed to operate these drive controls.

In the example embodiment, the stowable motion control system 10 generally includes a motion control input 11 shown as including a pair of yoke handles 16, and a control armature 14, an air bag 18, and yoke position sensing and force feedback servo/sensor steering column 20. The motion control system 10 may be mounted to a suitable support structure of the vehicle which may include or be accessible via an instrument panel 12 of the vehicle. In the example embodiment, the instrument panel 12 is fixed to the vehicle structure at a forward end of the passenger cabin. To permit stowing of the motion control system 10, the instrument panel 12 includes a compartment 22 in which the motion control system 10 can be stowed when driver control of the vehicle is not needed, and from which the motion control system 10 can be deployed for manual driver control of one or more of the vehicle control functions (steering, braking, acceleration). To, among other things, facilitate access to the motion control system 10, the compartment 22 may be open at one end 24 and include an upper wall 26, opposite lower wall 28 and opposed left and right sidewalls 30, 32. The upper and lower walls 26, 28 may be spaced apart in a vertical direction denoted by arrow 34 in FIG. 2, the sidewalls 30, 32 are spaced apart in a cross-car direction (denoted by arrow 36) that is perpendicular to the vertical direction and to a fore-aft direction (denoted by arrow 38) extending between opposed ends (e.g. front and rear ends) of the vehicle.

The steering column 20 may include a housing 40 in which may be received a steering shaft 42 by which the motion control system 10 is connected to the vehicle through a suitable bracket/mounting structure. The steering shaft 42 includes or is connected to a rotatable connector 44 that permits the steering shaft 42 and, in at least some implementation, the steering column 20, to rotate about a rotational axis 46 relative to the instrument panel 12. The rotatably connector 44 may be one or more parts that facilitates rotation of the steering column 20 about the axis 46. The steering column 20 or a mount therefore, may also include a sliding connector 48, which may include one or more components that permit sliding movement of the steering column 20 relative to the instrument panel 12 along the rotational axis 46. For example, in at least some implementations, the sliding connector 48 includes or is defined by a telescopic portion of the steering shaft 42 that extends to axially lengthen, and collapses to axially shorten, along the axis 46. So arranged, the steering column 20 can move axially relative to the instrument panel 12 and at least partly into and out of the compartment 22.

Figure 2:
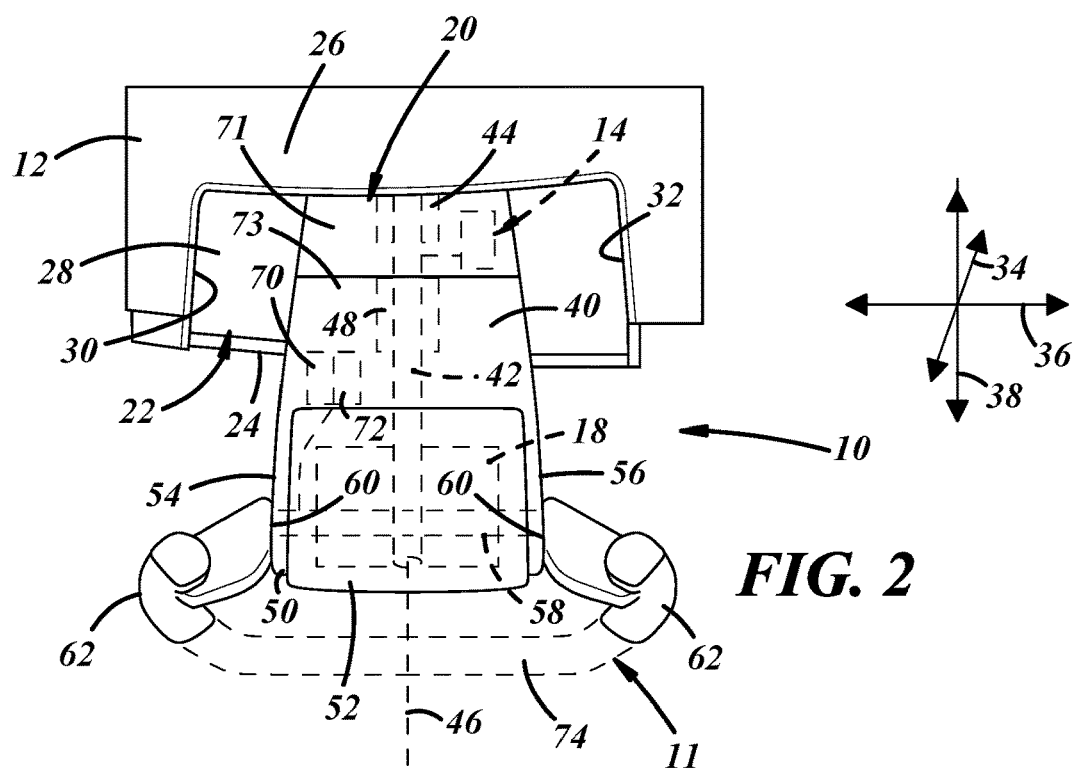
FIG. 2 is top and front perspective view of the motion control system of FIG. 1 in the deployed state.
Figure 6:
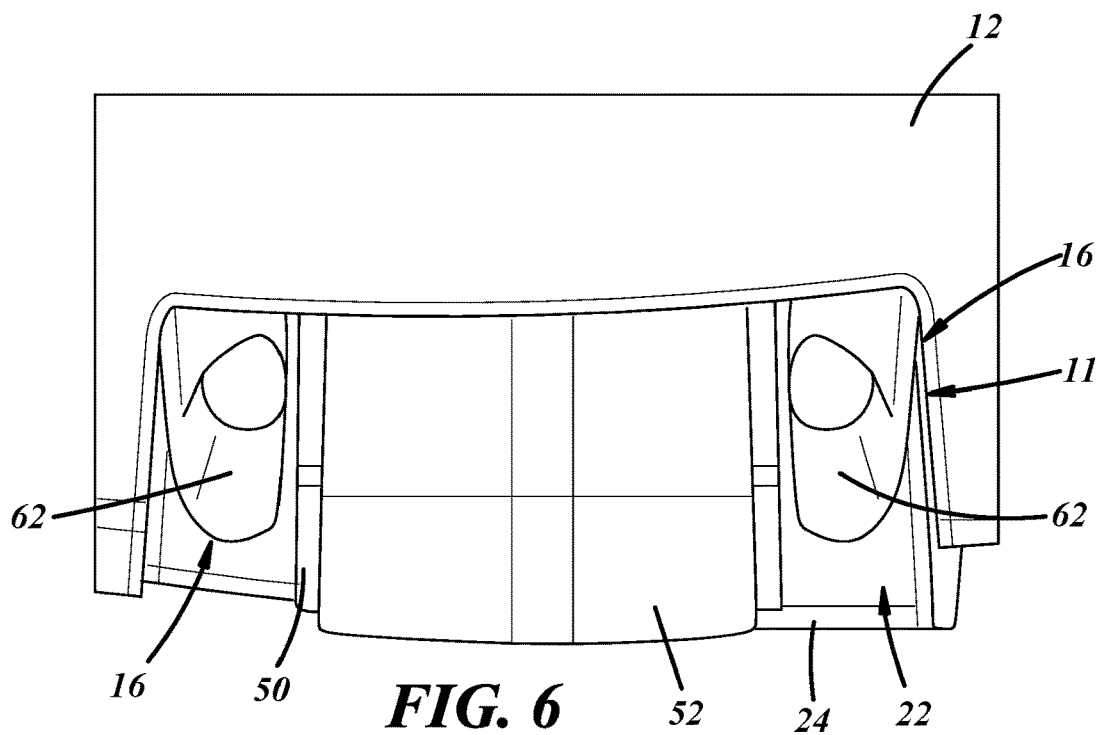
FIG. 6 is a top and front perspective view of the motion control system in the stowed state.

In this regard, FIG. 2 shows the motion control system 10 in a deployed position in which the motion control system 10 is axially moved to a farthest position from the instrument panel 12 and relative to the compartment 22. And FIG. 6 shows the motion control system 10 in a stowed position in which the motion control system 10 is axially moved to a nearest position relative to the instrument panel 12 and more fully received in the compartment 22.

The air bag 18 may be received within a chamber of the steering column housing 40, at an outermost or free end 50 of the housing 40. An air bag cover 52 may be connected to the housing 40 to conceal the air bag 18 from view within the cabin.

The control armature 14 may be mounted within the housing 40 of the steering column 20, if desired. The control armature 14 may be part or include an actuator, such as an electric motor, that is coupled to the steering shaft 42, such as by one or more gears, and arranged to provide a rotational force on the steering shaft 42. The actuator force can improve driving feel and provide force feedback relative to rotation of the steering shaft 42 and steering column 20, to improve user experience and facilitate finer steering adjustments and inhibit unintended steering adjustments such as might occur if the steering effort was too light (where the steering effort is the force required to rotate the steering shaft 42/column 20).

The yoke handles 16 (left/right) are (i.e. the motion control input 11 is) connected to opposite sides 54, 56 (FIG. 2) of the steering column 20 (e.g. its housing 40), spaced apart in the cross-car direction. As also shown in FIG. 2, the yoke handles 16 can be connected together by a linkage which may include or be defined by a crossbar 58 that is coupled to and rotates with the steering shaft 42. In this way, the steering column 20 may be rotatably coupled to the steering shaft 42, and efforts to rotate the steering column 20/steering shaft 42 may be applied to the yoke handles 16 to alter the steering angle of the motion control system 10. The cross-bar 58 may be received at least partly behind the air bag 18, where behind is in the fore-aft direction and so the air bag 18 is between the air bag cover 52 and the cross-bar 58. Of course, other arrangements may be used to rotatably couple the steering column 20 and steering shaft 42.

Further, the yoke handles 16 are movably connected to the steering column 20 and or cross-bar 58. In at least some implementations, the yoke handles 16 are connected at one end to pivots 60 and extend to free ends 62 that are spaced from the steering column 20 in the deployed position of the motion control system 10 shown in FIG. 2. The pivoted connection permits the yoke handles 16 to rotate or pivot about axis 64 at a non-zero angle (e.g. not oriented in the same direction) and which may be perpendicular to the rotational axis 46, such that the free end 62 of each yoke handle 16 moves circumferentially about the pivot axis 64. In the example shown and labeled in FIG. 1, the yoke handles are generally T-shaped, with the free ends defined by an outer section 57 that is perpendicular or within 20 degrees of perpendicular relative to a base 59 that extends from the outer section 57, between opposite ends 61, 63 of the outer section, to the end 65 coupled to the pivot 60. This provides comfortable gripping areas for a user's hands and facilitates confident handling of the yoke handles 16. Of course, other shapes and arrangements of yoke handles 16 may be utilized.

In at least some implementations, to permit the motion control system 10 cross-car size to be reduced when in the stowed position, the yoke handles 16 may move axially along the rotational axis 46 of the steering column 20/shaft 42 and then be pivoted about a second pivot axis 69 (FIG. 3) in a direction moving the free ends 62 of the yoke handles 16 toward the steering column 20, as shown by comparison of FIGS. 2 and 4, and FIGS. 3 and 5. To permit this movement, the cross-bar 58 may be slidably movable along the steering shaft 42 while maintain the cross-bar 58 rotatably coupled to the steering shaft 42 (e.g. the cross-bar may be axially keyed to the steering shaft, or coupled by a suitable sliding sleeve or other connector).

While the motion control system 10 could be mechanically connected to a traditional, mechanically linked steering system, the motion control system 10 may be enabled in at least some implementations as part of a steer-by-wire (SBW) system, which may eliminate a mechanical steering shaft between the steering column 20 and the steering gear/rack, in known manner. The SBW system includes an actuator 66 (FIG. 1) that drives the vehicle steering assembly and that is driven in response to signals generated as a function of the movement of the motion controller 10 about the rotational axis 46. The SBW system enables steering with rotational inputs less than +/−90° rotation, thereby eliminating the need to perform hand over hand operation in tight, high angle turns. Additionally, the SBW allows the steering column 20 to have a position in the cabin and a range of adjustment (e.g., ergonomic and stowing) that is not constrained by packaging the mechanical shaft.

In this way, rotation of the steering column 20/shaft 42 can be accomplished by applying force to one or both yoke handles 16 to rotate the yoke handles 16 and steering column 20 about the rotational axis 46. Clockwise rotation of the motion control system 10 causes the steering angle to change in a first direction and counterclockwise rotation of the motion control system 10 changes the steering angle in a second direction, similar to such rotations of a traditional steering wheel. Suitable clearance can be provided between the instrument panel 12, within the compartment 22, and the steering column housing 40 to permit rotation of the housing 40 relative to the instrument panel 40, or the housing may be provided in more than one piece, with a first or base section 71 that does not rotate and a second, rotating section 73 that extends from the base section 71 to the free end 50 and which rotates with the motion control input 11/yoke handles 16 and relative to the base section 71. In other implementations, the housing 40 might not rotate and instead, the yoke handles 16 may move/rotate relative to the housing 40 about the rotational axis 46. In such implementations, slots may be provided in the housing 40 to accommodate movement of the yoke handles 16 relative to the housing 40, and the steering shaft 42 would also rotate relative to the housing 40.

Further, the motion control system 10 is enabled by drive-by-wire and brake-by-wire systems in which throttle actuation signals and brake actuation signals are sent from the motion control system 10 to suitable throttle and brake actuators 67, 68 (FIG. 1) that control the vehicle throttle and brake assemblies. Such drive-by-wire and brake-by-wire systems and actuators are generally known. In the example motion control system 10, the yoke handles 16 act as both the throttle actuator and brake actuator. To cause a throttle input, the yoke handles 16 are moved in a first direction about the pivot axis 64, and to cause a brake input, the yoke handles 16 are moved in the opposite, second direction about the pivot axis 64.

In at least some implementations, to cause a throttle input to accelerate and move the vehicle forward the yoke handles 16 may be pushed forward (e.g. pushed in the fore-aft direction), so the upper ends 61 move toward the front of the vehicle as the yoke handles 16 rotate about the pivot axis 64. Likewise, to cause a brake input and slow or stop the vehicle, the yoke handles 16 may be rotated back about the pivot axis 64, so that the upper ends 61 move away from the front of the vehicle. This enables intuitive control of vehicle motion wherein rotating the yoke handles 16 forward causes forward motion and rotating the yoke handles 16 backward causes braking. With throttle and braking inputs provided by the motion control system 10, separate throttle and braking inputs, like traditional foot-actuated pedals, need not be provided in the vehicle, in at least some implementations.

As diagrammatically shown in FIG. 2, suitable sensors 70 and force feedback mechanisms or actuators 72 can provide desired feel or forces on the motion control input 11 and control the throttle and braking systems as a function of the motion control input movement where the rate and extent of movement can cause desired or predetermined throttle and braking response. Further, a dead spot, detent or force feedback zone can be provided between forward and braking motions of the motion control input 11/yoke handles 16 so that a user can clearly distinguish between throttle and brake actuation zones. Still further, when the vehicle is stopped, backward motion of the motion control input 11/yoke handles 16 can cause reverse motion of the vehicle, if desired. Also, the yoke handles 16 may be connected together by a linkage/spanning member (as noted below), actuator(s) or both so that movement of one yoke handle 16 about its pivot axis 64 causes a complementary, mirrored movement of the other yoke handle 16. This permits throttle and braking inputs to be provided to either yoke handle 16 for one-handed control, or to both yoke handles 16 simultaneously for two-handed control. Further, forces applied to rotate the steering column 20 and change the vehicle steering angle may be applied to one or both yoke handles 16.

As shown in FIGS. 1 and 2 by dashed lines, the yoke handles 16 may be connected together by a spanning member 74 so that the yoke handles 16 do not move independently, and so that the entire motion control input 11 functions as a single body, and rotates as a single body about the rotational axis 46 and pivots about the pivot axis 64. This may enable motion control (steering, throttle and braking) by manipulation of any part of the motion control input 11 including the spanning member 74, not just the handles 16. The spanning member 74 may be integral with the yoke handles 16 and define part of the motion control input 11, and/or the spanning member 74 could be movable relative to the yoke handles 16 to facilitate folding the motion control input 11 for storage in the stowed position, but this is not necessary. Further, while one spanning member 74 is shown connected to the lower ends of the yoke handles 16 providing a generally U-shaped motion control input 11, the spanning member could be provided at the upper ends of the yoke handles or in both locations, as desired.

The motion control input 11 and servo/sensor arrangements may be configured to: (i) support the driver laterally and longitudinally while allowing rotational motion for steering and pivoting/fore-aft tilting motion for acceleration and braking or forward/rearward directional (longitudinal) control, (ii) provide structural interfaces that transmit motion intent by the driver and tunable feedback from the vehicle systems to the driver, and (iii) tune resistive forces for steering and longitudinal controls to ensure driver support and control intent functions are optimized.

The system advantageously provides: (i) enablement of dual mode driver controls presentation/positioning, including a deployed position for manual driving control and a stowed position for automated driving control. Such capability is affected by a steering column 20 with additional telescopic retraction travel and a steering input mechanism to draw the yoke handles 16 inward toward the steering shaft axis 46 and potentially forward to draw in behind the rearward face of the driver air bag cover 52; (ii) collapsing or reducing the largest width of the typical steering wheel to the stowed state for automated driving control mode or for storage when the vehicle is off/not in use; and (iii) partial or full elimination of the need for pedals for longitudinal acceleration and braking. Such capability is affected by a combination of yoke/hand control surfaces, connecting structure to allow the handheld elements/yoke handles 16 to pivot together and a torque/angle force feedback servo/actuator to measure the user input displacement angle and provide a tunable feel to the user while tilting the yoke handles 16 forward and rearward. The tunable feel may incorporate progressively increasing and/or decreasing force through rotation, detent feel to designate limits of travel, changing from acceleration to braking or forward to rearward direction; (iv) enablement of total vehicle steering and longitudinal control as a hand control interface that supports torso loading inputs from vehicle motion and does not require specific finger/thumb fine motor skills for precise vehicle control; (v) the ability to achieve vehicle motion control through two-hand or single-hand interaction (ambidextrous); and (vi) the ability for the driver air bag 18 to be inflated in any possible steering control condition for driver safety while the vehicle is in motion (e.g., deployed, stowed, or transition therebetween). Such capability is not affected by the collapsing/folding yoke handles 16 and telescoping steering column 20 that may be contained forward in vehicle (behind the driver air bag 18 relative to the driver), allowing the driver air bag 18 to maintain an inflatable mode of operation in all fixed and moving states of the motion control system 10.

As such, the stowable motion control system 10 provides longitudinal control of the vehicle through a tiltable or pivotable control interface, requiring small amounts of pressure from one or both hands of a user to completely control the direction and speed of the vehicle. Combining the tiltable control motion with electronics that can sense user input torque/angle and vary the feel and position of the control interface provides an intuitive and robust means of vehicle control.

Figure 3:
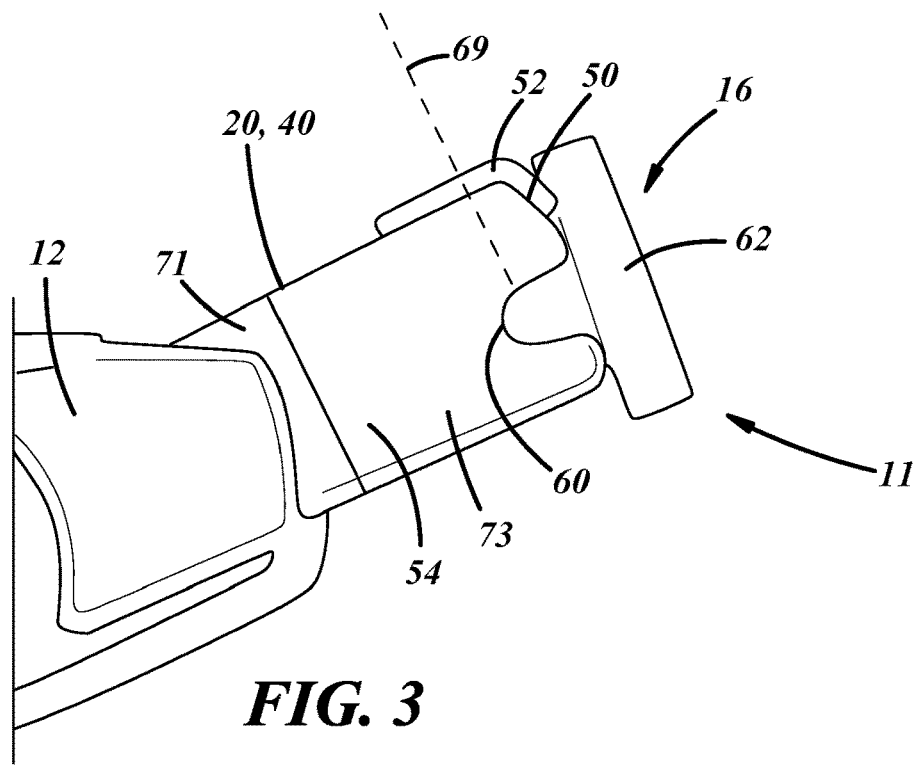
FIG. 3 is a side view of the motion control system in the deployed state.
Figure 4:
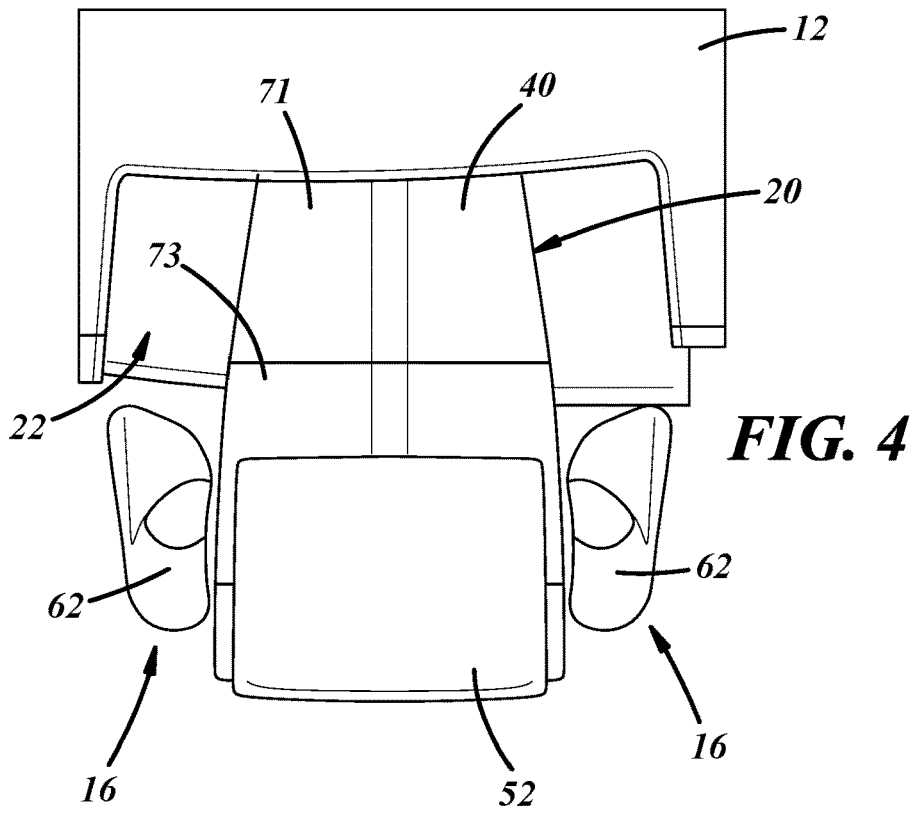
FIG. 4 is a top and front perspective view showing the motion control system in a transitional position between the deployed state and a stowed state.
Figure 5:
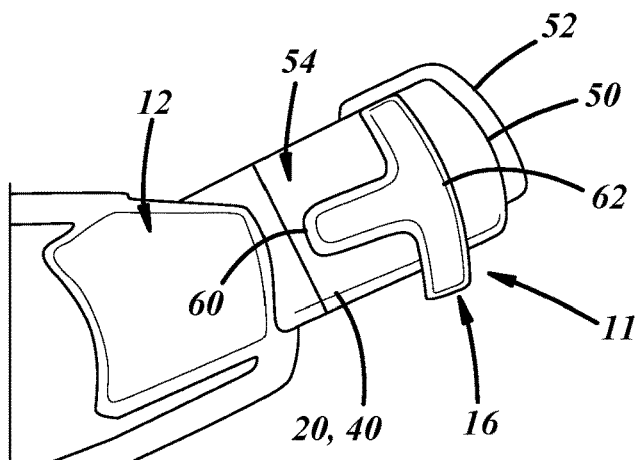
FIG. 5 is a side view of the motion control system in the transitional position of FIG. 4.
Figure 7:
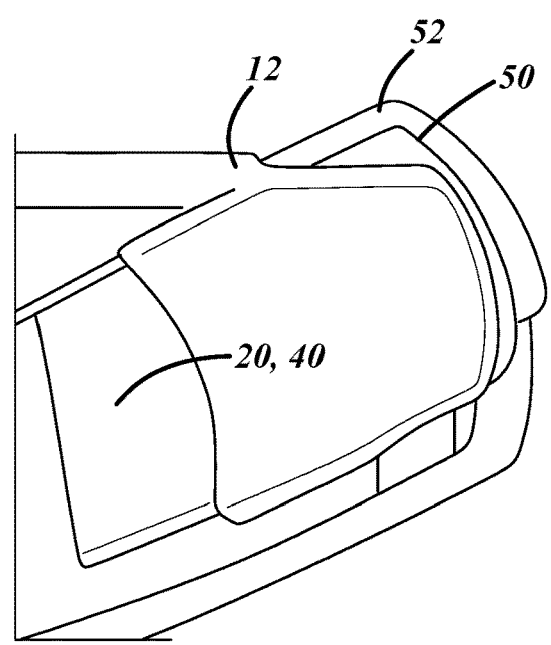
FIG. 7 is a side view of the motion control system in the stowed state.

As shown in the drawings, the stowable motion control system 10 is selectively movable between a stowed state or position, shown in FIGS. 6 and 7, to a deployed state or position, shown in FIGS. 1-3. To accomplish this movement, from the deployed position of FIGS. 1-3, the yoke handles 16 are slid forwardly in the fore-aft direction and pivoted about the second pivot axis 69 until the free end 62 of the yoke handles 16 are generally adjacent to the free end 50 of the steering column 20. In at least some implementations, in a folded position of the yoke handles 16, a centerline of the yoke handles 16, from the pivoted end to the free ends 62 may be generally parallel to the axis of rotation 46 of the steering shaft 24, where generally includes parallel and angles up to 15 degrees from parallel. This transitional or intermediate position is shown in FIGS. 4 and 5. From this position, the steering column 20 is moved axially (relative to the rotational axis) so that more of the motion control system 10 is received in the compartment 22. In the stowed position, the motion control system 10 is retracted into the compartment 22 of the instrument panel 12 and partially and up to fully concealed therein, although in at least some implementations, at least the air bag cover 52 remains exposed and the air bag 18 is arranged so that it may be deployed in any position of the motion control system 10. In at least some implementations, at least a majority of the motion control input 11 and/or its yoke handles 16 (i.e. a majority of the volume of the yoke handles 16) and up to all of the yoke handles 16, or all of the motion control input 11 is received within the compartment 22, which is to say inwardly of the boundary of the open end 24 of the compartment 22.

With the motion control system 10, steering, forward acceleration and movement, braking and reverse acceleration and movement of the vehicle may be controlled by one or both hands of a user. Traditional steering wheel, throttle pedal and brake pedals are not needed, in at least some implementations. Further, the motion control system 10 can conveniently be stowed when not needed to increase cabin space for vehicle occupants, facilitate entering and exiting the vehicle, and save weight and cost. The controls can be intuitively utilized with familiar motions for improved driver familiarity and control.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A motion control system for a vehicle, comprising:
a steering shaft having an axis of rotation;
a motion control input coupled to the steering shaft for rotation with the steering shaft about the axis of rotation, wherein the motion control input is pivotable about a pivot axis that is at a non-zero angle to the axis of rotation, and wherein pivoted movement of the motion control input about the pivot axis and relative to the steering shaft in a first direction causes a forward motion of the vehicle, and pivoted movement of the motion control input about the pivot axis and relative to the steering shaft in a second direction that is opposite to the first direction reduces a speed of forward motion of the vehicle; and
a cross-bar coupled to the steering shaft and to which the motion control input is connected, the cross-bar being coupled to the steering shaft for co-rotation of the cross-bar with the steering shaft, wherein the cross-bar rotates relative to the steering shaft when the motion control input is moved in the first direction and the second direction.

2. The motion control system of claim 1 wherein at least part of the steering shaft, or a sliding connector coupled to the steering shaft, is slidable in the direction of the rotational axis.

3. The motion control system of claim 1 wherein the cross-bar is slidably coupled to the steering shaft to change the axial location of the cross-bar relative to the steering shaft, with respect to the axis of rotation.

4. The motion control system of claim 3 wherein the motion control input is pivotably connected to the cross-bar for movement in the first direction and the second direction.

5. The motion control system of claim 1 which also includes a steering column having a housing in which at least part of the steering shaft is received.

6. The motion control system of claim 5 wherein the motion control input extends outwardly relative to opposite sides of the housing.

7. The motion control system of claim 6 wherein the motion control input includes two yoke handles that are slidably coupled to the steering shaft for movement relative to the housing in the direction of the rotational axis.

8. The motion control system of claim 1 wherein the motion control input is coupled to the cross-bar at a first end and has a free end opposite to the first end, the motion control input is pivotably connected at the first end to the cross-bar for movement about a second pivot axis to a deployed position and to a stowed position in which the free end is closer to the axis of rotation of the steering shaft than when the motion control input is in the deployed position.

9. A vehicle, comprising:
an instrument panel having a compartment;
a steering shaft having an axis of rotation and being at least partially received in the compartment, and at least part of the steering shaft is slidable relative to the instrument panel in the direction of the rotational axis;
a motion control input coupled to the steering shaft for rotation with the steering shaft about the axis of rotation, wherein the motion control input is pivotable relative to the steering shaft and about a pivot axis that is at a non-zero angle to the axis of rotation, and wherein pivoted movement of the motion control input about the pivot axis in a first direction causes a forward motion of the vehicle, and pivoted movement of the motion control input about the pivot axis in a second direction that is opposite to the first direction reduces a speed of forward motion of the vehicle, and wherein the steering shaft and the motion control input have a stowed position in which the motion control input is received at least partially in the compartment and a deployed position in which the motion control input is outboard of the compartment; and
a cross-bar coupled to the steering shaft and to which the motion control input is connected, the cross-bar being coupled to the steering shaft for co-rotation of the cross-bar with the steering shaft about the axis of rotation of the steering shaft, the cross-bar rotates relative to the steering shaft when the motion control input is moved in the first direction and the second direction, the cross-bar is slidably coupled to the steering shaft to change the axial location of the cross-bar relative to the steering shaft, with respect to the axis of rotation, and wherein the motion control input is pivotably connected to the cross-bar for movement about a second pivot axis to the stowed position and the deployed position.

10. The vehicle of claim 9 which also includes a steering column having a housing in which at least part of the steering shaft is received, and wherein part of the housing extends outwardly from the compartment in the deployed position.

11. The vehicle of claim 10 wherein the motion control input extends outwardly relative to opposite sides of the housing.

12. The vehicle of claim 11 wherein the motion control input is slidably coupled to the steering shaft for movement relative to the housing in the direction of the rotational axis.

13. The vehicle of claim 10 which also includes an air bag carried by the housing, and an air bag cover carried by the housing, wherein the air bag cover is received over an outer end of the housing and the compartment includes an open end facing into an interior of the vehicle and the air bag is adjacent to the open end and is oriented out of the compartment so that the air bag may deploy within an interior of the vehicle in the stowed position.

14. The vehicle of claim 13 wherein, in the deployed position, the outer end is received in the interior of the vehicle and is spaced from the instrument panel.

15. The vehicle of claim 9 wherein, in the stowed position, at least a majority of the motion control input is received within the compartment.

* * * * *